(12) United States Patent
Park et al.

(10) Patent No.: US 9,413,193 B2
(45) Date of Patent: Aug. 9, 2016

(54) CONTROL SYSTEM OF ENERGY STORAGE CLUSTER AND METHOD FOR DISTRIBUTING ENERGY USING THE SAME

(71) Applicant: KT CORPORATION, Seongnam-si (KR)

(72) Inventors: Jung-Bae Park, Seoul (KR); Min-Gyung Kim, Pyeongtaek-si (KR)

(73) Assignee: KT Corporation, Seongnam (KR)

( * ) Notice: Subject to any disclaimer, the term of this patent is extended or adjusted under 35 U.S.C. 154(b) by 610 days.

(21) Appl. No.: 13/673,343

(22) Filed: Nov. 9, 2012

(65) Prior Publication Data
US 2013/0158727 A1 Jun. 20, 2013

(30) Foreign Application Priority Data
Dec. 15, 2011 (KR) .................. 10-2011-0135181

(51) Int. Cl.
*G06F 19/00* (2011.01)
*H02J 7/34* (2006.01)
*H02J 13/00* (2006.01)
*H02J 3/38* (2006.01)
*H02J 7/00* (2006.01)

(52) U.S. Cl.
CPC ............... *H02J 7/34* (2013.01); *H02J 13/0006* (2013.01); *H02J 3/383* (2013.01); *H02J 3/386* (2013.01); *H02J 7/0013* (2013.01); *Y02B 10/14* (2013.01); *Y02B 70/3216* (2013.01); *Y02E 10/563* (2013.01); *Y02E 10/763* (2013.01); *Y02E 40/72* (2013.01); *Y04S 10/123* (2013.01); *Y04S 20/221* (2013.01)

(58) Field of Classification Search
CPC .. Y02E 40/72; Y02E 10/563; Y02B 70/3216; H02J 7/34; H02J 13/0006; H02J 3/386

USPC ........................................................ 700/286
See application file for complete search history.

(56) References Cited

U.S. PATENT DOCUMENTS

| | | | | |
|---|---|---|---|---|
| 2008/0281663 | A1* | 11/2008 | Hakim et al. | 705/8 |
| 2009/0192655 | A1* | 7/2009 | Ichikawa et al. | 700/291 |
| 2011/0246259 | A1* | 10/2011 | Hostyn et al. | 705/7.31 |
| 2012/0059526 | A1* | 3/2012 | Maini et al. | B60L 11/1824 700/291 |
| 2012/0150378 | A1* | 6/2012 | Maini et al. | H01M 10/42 701/22 |
| 2012/0205977 | A1 | 8/2012 | Shin et al. | |
| 2012/0323390 | A1* | 12/2012 | Kobayasi | 700/295 |

(Continued)

FOREIGN PATENT DOCUMENTS

| | | |
|---|---|---|
| JP | 2006-288162 A | 10/2006 |
| JP | 2006288162 A * | 10/2006 |
| KR | 10-2004-0074060 A | 8/2004 |

(Continued)

*Primary Examiner* — Michael D Masinick
(74) *Attorney, Agent, or Firm* — Sughrue Mion, PLLC

(57) ABSTRACT

Provided a cluster control system which controls energy storage systems (ESSs) within the cluster and a method for distributing energy among the ESSs in the cluster. The control system includes: ESSs which are provided in a consumption facility or a building and which supply power to respective loads in the facility or building; and a cluster control server distributing energy between the ESSs in the cluster based on an energy level with respect to stored energy amounts of the ESSs. Energy in a cluster in which a plurality of distributed ESSs are grouped is efficiently distributed to a predetermined zone partitioned by the cluster such that the cluster may mange the energy independent of supply of the energy from an external power system.

12 Claims, 10 Drawing Sheets

(56) References Cited

U.S. PATENT DOCUMENTS

| | | | |
|---|---|---|---|
| 2013/0030590 A1* | 1/2013 | Prosser | 700/295 |
| 2013/0229059 A1* | 9/2013 | Baba et al. | 307/35 |
| 2013/0338845 A1* | 12/2013 | Jerphagnon | 700/297 |
| 2014/0347016 A1* | 11/2014 | Becker et al. | 320/136 |

FOREIGN PATENT DOCUMENTS

| | | |
|---|---|---|
| KR | 10-0586931 B1 | 5/2006 |
| KR | 10-2011-0053841 A | 5/2011 |
| WO | 2008/117392 A1 | 10/2008 |
| WO | WO 2008117392 A1 * | 10/2008 |

* cited by examiner

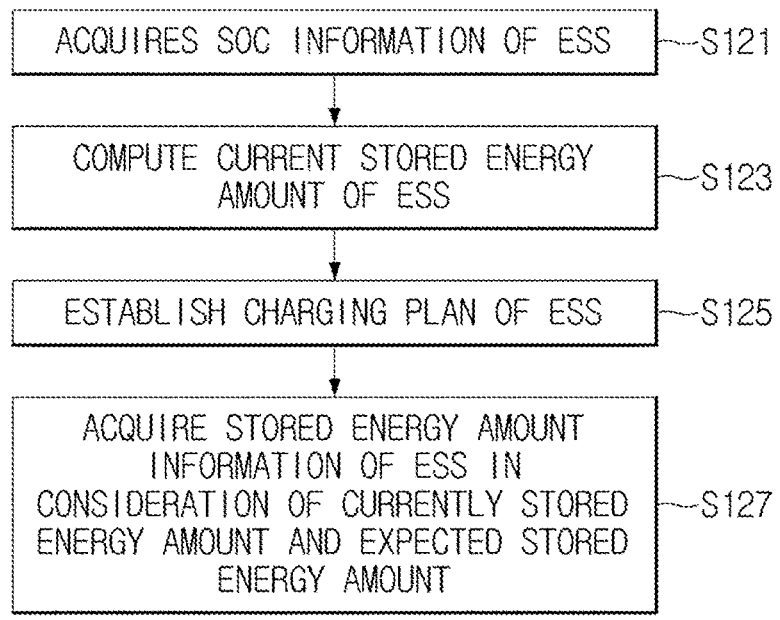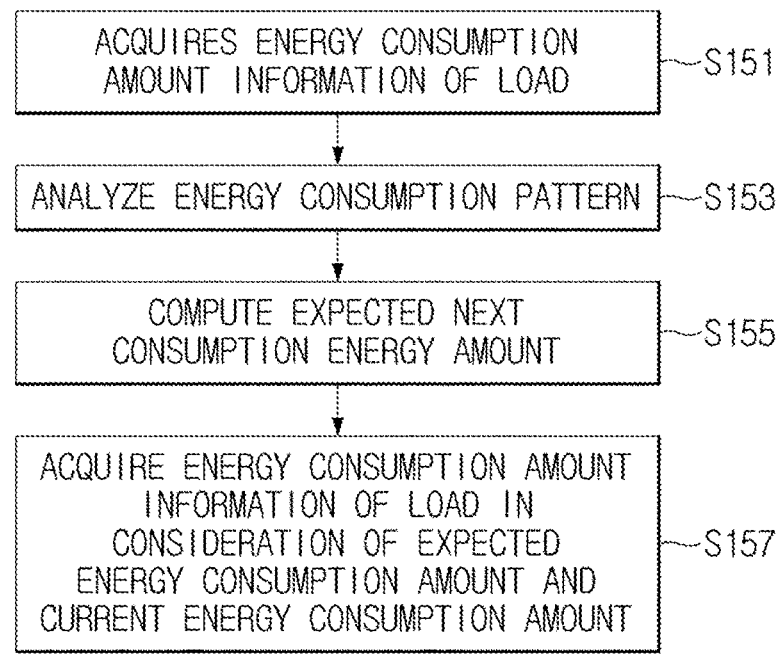

CONTROL SYSTEM OF ENERGY STORAGE CLUSTER AND METHOD FOR DISTRIBUTING ENERGY USING THE SAME

CROSS-REFERENCE TO RELATED APPLICATIONS

This application claims the benefit of priority from the Korean Patent Application No. 10-2011-0135181, filed with the Korean Intellectual Property Office on Dec. 15, 2011, the disclosure of which is incorporated herein by reference in its entirety.

BACKGROUND

1. Field

Exemplary embodiments relate to a control system of an energy storage system (referred to as 'ESS' hereinafter) and a method for distributing energy using the same. More particularly, exemplary embodiments relate to a cluster control system of the ESS, and a method for distributing energy to an energy load or an ESS of each consumption facility or building.

2. Description of Related Art

ESS is a device for converting electrical energy into chemical energy and storing the chemical energy, and has been commonly used as power of a portable electronic device of an electric vehicle. Particularly, as an energy industry is revolving around renewable energy, a smart grid being capable of using electricity at time necessary and an ESS acting as a storage for distribution power, have been in increased demand.

As the need for power quality stabilization and power operation efficiency reconsideration increased because of a low carbon green growth policy paradigm which increased the need for renewable energy source, the ESS equipment has been quickly supplied.

FIG. 1 is a schematic configuration diagram illustrating a consumption facility in which an ESS is installed.

An ESS 50 installed in the consumption facility stores energy and provides the stored energy based on a user selection of increasing energy efficiency in the consumption facility such that the stored energy is used when energy consumption and/or costs of power are high.

The ESS 50 is separately installed and may receive and store power from external power system 10 during a time period when energy consumption is low and/or when a cost of power is relatively low. However, in general, the ESS 50 stores power produced by power generation equipment operatively associated with a renewable energy source. FIG. 1 shows a configuration in which a photovoltaic power generation equipment 70 is connected to the ESS 50, and power produced by the photovoltaic power generation equipment 70 is stored in the ESS 50 by way of example.

The larger the charging capacity of an ESS, the higher the cost of ESS equipment. Because there is a limitation on an amount of energy that can be stored in the ESS, it is difficult to continuously operate the ESS in a fully charged state. Accordingly, it is substantially difficult to satisfy power consumption requirements using the ESS equipment alone without an external power system.

Further, an operation of the ESS is controlled by a Battery Management System (BMS), and energy consumption and control of a load in the consumption facility is controlled by a Home Energy Management System (HEMS), such that a total power management of the consumption facility requires control of two separate systems, thereby diminishing efficiency of the operation of the ESS and of the power management.

Furthermore, when a Building Energy Management System (BEMS) is installed in a building, and a Factory Energy Management System (FEMS) is installed in a factory, the same problem occurs.

Accordingly, there is a need for increasing operational efficiency of ESS equipment according to increased supply of a renewable energy source and a need to further improve a formation of a smart grid.

SUMMARY

It is an aspect to provide a control system of an ESS for increasing operational efficiency of the ESS equipment according to increased supply of a renewable energy source. It is also an aspect to improve formation of a smart grid, and an operating method thereof.

The larger the charging capacity of an ESS, the higher the cost of the ESS equipment. Because there is a limit on an amount of energy that can be stored in the ESS, it is difficult to continuously operate the ESS in a fully charged state. Accordingly, it is substantially difficult to satisfy consumption requirements using the ESS equipment alone without an external power system. An exemplary embodiment addresses this issue.

Further, an operation of the ESSs and energy management of loads are dualized and performed in different management systems, thereby diminishing the efficiency of the operation of the ESS and energy management. An exemplary embodiment addresses this issue.

In accordance with an aspect of an exemplary embodiment, a control system of an energy storage cluster is provided which includes: energy storage systems (ESSs) which supply power to a plurality of respective loads; and a cluster control server which distributes energy between the ESSs based on individual energy levels stored in the ESSs with respect to energy required by the plurality of respective loads.

The cluster control server may include: an ESS management device which computes current stored energy amounts in each of the ESSs and which controls charging and discharging based on the computed current stored energy amounts; a load management device which acquires and analyzes energy consumption amount information with respect to the plurality of respective loads to manage energy consumption with respect to the plurality of respective loads based on the acquired energy consumption amount information; and an energy supply management device which determines redundant stored energy and insufficient amounts of energy for each of the ESSs based on the acquired energy consumption amount of a respective load associated with each respective ESS and an energy level of said each respective ESS obtained based on the computed current stored energy amounts for said each respective ESS to distribute energy between the ESSs.

The energy supply management device may include: a cluster energy storing manager which determines an energy level based on the computed stored energy amount information of said each respective ESS obtained by communicating with the ESS management device; a cluster energy consumption manager which determines a redundant energy supply amount or an insufficient energy supply amount of said each respective ESS based on energy consumption amount information obtained by communicating with the load management device; and a cluster energy distributing manager which determines an energy supply difference of the ESSs based on information provided by the cluster energy storing manager and the cluster energy consumption manager, and which manages a distribution of energy stored in said each respective ESS based on the determined energy supply difference of ESSs.

The ESS management device may include: a State of Charge (SOC) manager which acquires SOC information of said each respective ESS in real time or periodically, and which integrates the acquired SOC information to compute a current stored energy amount of said each respective ESS; and a charging/discharging manager which controls charging and discharging with respect to said each respective ESS based on the current stored energy amount information obtained from the SOC manager.

The load management device may include an energy consumption manager which acquires energy consumption information of the loads corresponding to the respective ESSs and which analyzes an energy consumption pattern using the energy consumption information to compute real time energy consumption amount information and expected energy consumption amount information with respect to the loads.

In accordance with an aspect of an exemplary embodiment, a control system may further include: a plurality of clusters divided by zones and each having a corresponding set of loads and a corresponding set of ESSs; and a central control server which acquires energy supply information of the plurality of clusters and which distributes energy of a cluster storing a redundant energy supply amount with respect to a first respective load to a cluster in which energy supplied to a second respective load is insufficient by communicating with respective cluster servers.

The central control server may include: a central energy storing manager which manages stored energy amount information of each cluster; a central energy consumption manager which manages energy consumption amount of the cluster; and a central energy distribution manager which manages energy distribution between the clusters based on information from the central energy storing manager and the central energy consumption manager.

In accordance with yet another aspect of an exemplary embodiment, a method of distributing energy includes: classifying an energy level according to stored energy amount information of each of a plurality of energy storage systems (ESSs) and determining an energy distribution between the ESSs based on the classified energy level; and distributing energy between the ESSs according to the determined energy distribution.

The classifying the energy level may include: acquiring energy level information according to the stored energy amount of each of the ESSs; acquiring energy consumption amount information of a load associated with a respective ESS from the ESSs; and computing at least one of a redundant energy supply amount and an insufficient energy supply amount based on the energy level information and the acquired energy consumption amount information.

The acquiring the energy consumption amount information may include: acquiring state of charge (SOC) information of each respective ESS in real time or periodically, and integrating the acquired SOC information to compute a current stored energy amount of said each respective ESS; establishing a charging plan for said each respective ESS based on the computed current stored energy amount with respect to said each respective ESS; acquiring stored energy amount information based on the current stored energy amount of said each respective ESS and an expected stored energy amount according to the charging plan; and classifying the energy level for said each respective ESS according to the stored energy amount information.

The acquiring the energy consumption amount information may include: acquiring energy consumption amount information of a load associated with the respective ESS and analyzing an energy consumption pattern to calculate expected energy consumption amount information; and acquiring the energy consumption amount information based on current energy consumption amount information and the calculated expected stored amount information with respect to the load.

The computing the redundant energy supply amount may include: determining a redundant ESS which stores a redundant energy supply amount and an insufficient ESS in which supplied energy is insufficient based on the energy level information and the energy consumption amount information; computing a redundant amount with respect to a stored energy amount based on stored energy amount information of a load associated with the redundant ESS; computing an insufficient amount based on expected stored energy amount information according to a power generation amount of the insufficient ESS; and selecting at least one redundant ESS which stores the redundant amount which is greater or equal to an insufficient amount of the insufficient ESS.

In accordance with yet another aspect of an exemplary embodiment, a method may further include: forming a plurality of clusters such that each of the ESSs is allocated to one of the plurality of cluster; acquiring and analyzing stored energy amount information of the ESSs in each cluster and stored energy amount information of a plurality of loads in each cluster and determining a redundant energy supply amount and an insufficient energy supply amount for each cluster; and distributing energy of a cluster storing a redundant energy supply amount to a cluster in which supplied energy is insufficient.

BRIEF DESCRIPTION OF THE DRAWINGS

The above and other aspects will be more apparent from the following detailed description of exemplary embodiments taken in conjunction with the accompanying drawings, in which:

FIG. 8 is a flowchart illustrating a method of acquiring stored energy amount information with respect to an ESS according to an exemplary embodiment;

FIG. 9 is a flowchart illustrating a method of acquiring usage load energy amount information in an exemplary embodiment;

DETAILED DESCRIPTION OF EXEMPLARY EMBODIMENTS

Exemplary embodiments are described with reference to the accompanying drawings in detail. The same reference numbers are used throughout the drawings to refer to the same or analogous parts. Detailed descriptions of well-known functions and structures incorporated herein may be omitted to avoid obscuring the subject matter of exemplary embodiments.

In an exemplary embodiment, a control system for an energy storage cluster is provided. Distributed ESSs are grouped by zones to form an energy storage cluster. A cluster control server in one cluster distributes energy between ESSs based on energy level with respect to stored energy amount of each ESS.

Figure 1:
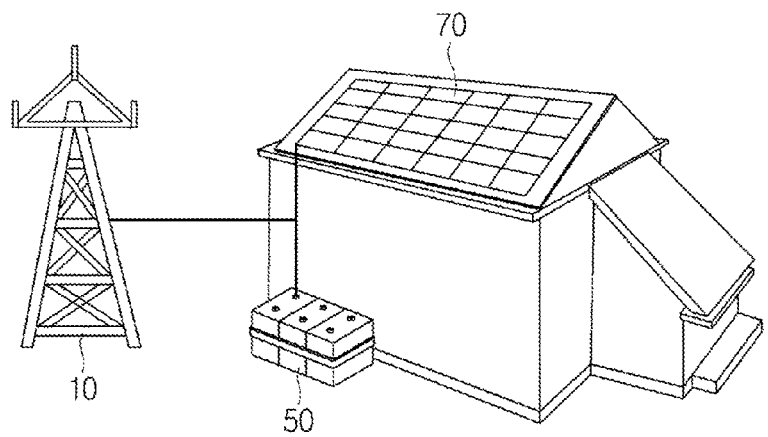
FIG. 1 is a schematic diagram illustrating a configuration of consumption facility in which an ESS is installed according to related art.
Figure 2:
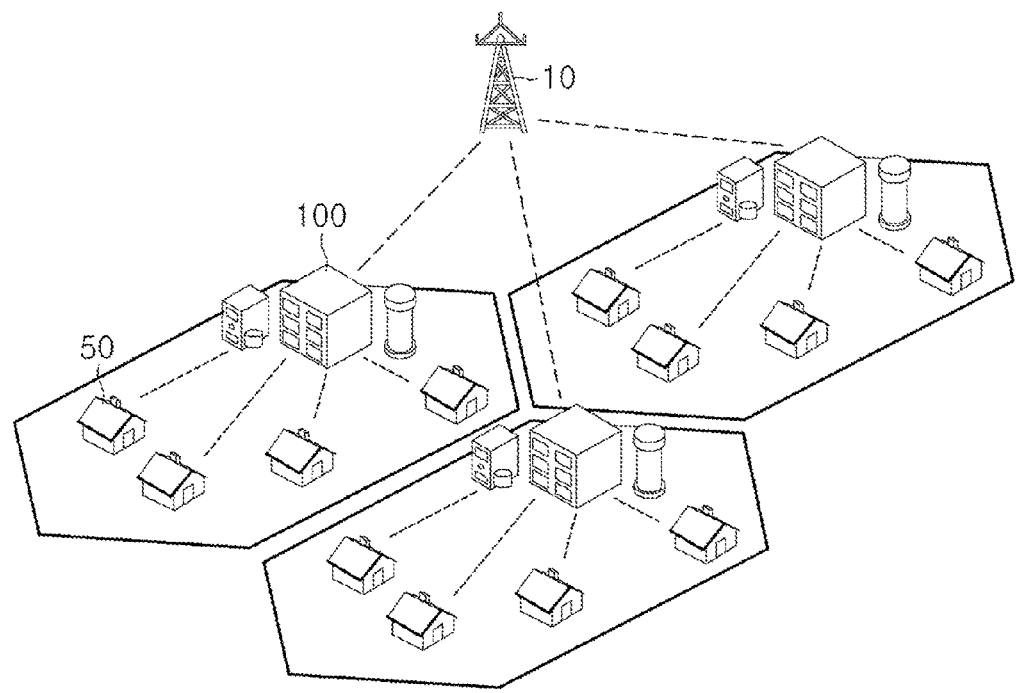
FIG. 2 is a schematic diagram illustrating a configuration of an energy storage cluster according to an exemplary embodiment.

FIG. 2 is a schematic diagram illustrating a configuration of an energy storage cluster according to an exemplary embodiment.

A control system of an energy storage cluster according to an exemplary embodiment is schematically distributed to consumption facilities or buildings of a plurality of zones, and includes a cluster control server 100 for storing energy, managing clusters, grouping ESSs 50 for supplying energy for each predetermined zone, and managing ESSs 50 of each cluster, and distributing energy between ESSs 50 in the cluster based on stored energy amount of the ESS 50 and based on energy amount used by a load associated with the ESS 50.

Here, the energy stored in the ESS 50 may become energy received from an external power system 10. Preferably, the energy stored in the ESS 50 may be energy produced by a renewable energy power generation device (not shown) such as solar light, wind power, or tidal power. Energy transmission between ESSs may use an installed grid of external power system 10 or a grid separately formed to connect ESSs with each other in the cluster i.e., a grid dedicated to connecting ESSs.

Figure 3:
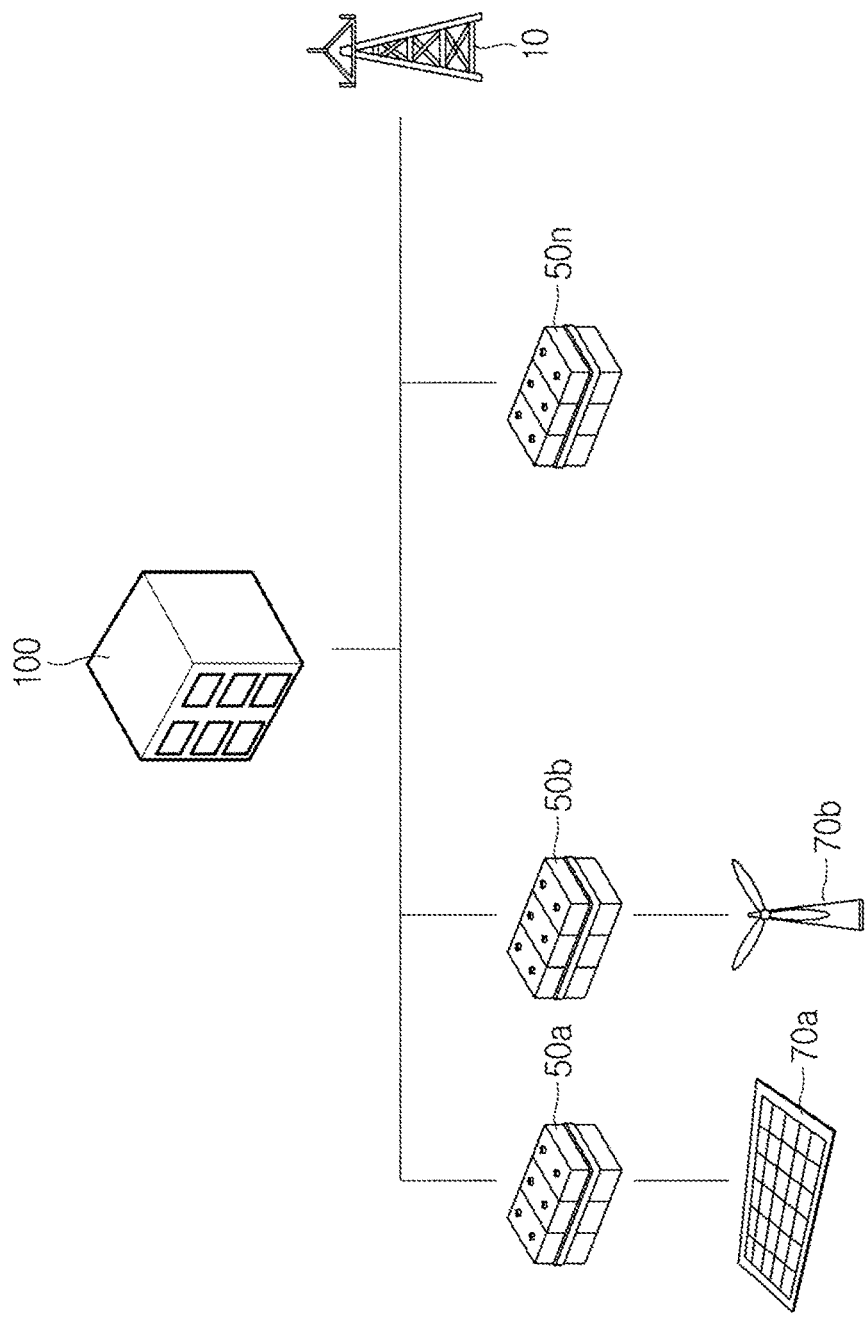
FIG. 3 is a schematic diagram illustrating a configuration of one cluster according to an exemplary embodiment.

Energy may be distributed using the control system of an energy storage cluster according to an exemplary embodiment. FIG. 3 is a schematic diagram illustrating a configuration of one cluster according to an exemplary embodiment.

An exemplary embodiment of FIG. 3 illustrates an ESS 50a of a consumption facility A (not shown), an ESS 50b of a consumption facility B (not shown), . . . to an ESS 50n of a consumption facility n (not shown) being grouped in one cluster, and being managed by a cluster control server 100. Energy produced using a photovoltaic power generation equipment 70a is stored in the ESS 50a and energy consumed by a load of the consumption facility A is supplied using the ESS 50a in the consumption facility A. Energy produced using a wind power generation equipment 70b is stored in the ESS 50b and energy consumed by a load of the consumption facility B is supplied using the ESS 50b in the consumption facility B. Energy from the external power system 100 or energy from an ESS of another consumption facility is stored in an ESS 50n, and energy consumed by a load of the consumption facility n is supplied using an ESS 50n in a facility N without having a separate renewable energy source.

For example, when power demand is rapidly increased in the consumption facility A, a cluster control server 100 distributes energy of an ESS 50b installed in consumption facility B in a relatively sufficient energy situation and energy of an ESS 50n installed in consumption facility N as well as an stored energy amount of an ESS 50a installed in the consumption facility A to optimize supply of total energy in the cluster.

Hereinafter, respective constructions of a control system of an energy storage cluster according to an exemplary embodiment will be described in detail.

Figure 4:
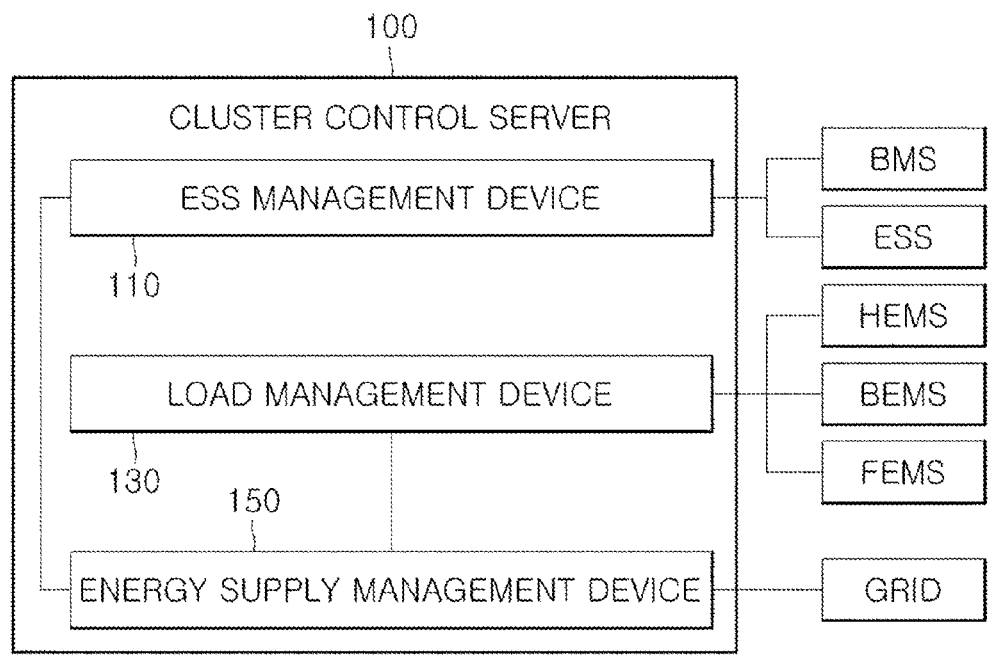
FIG. 4 is a block diagram illustrating a configuration of a cluster control server according to an exemplary embodiment.

FIG. 4 is a block diagram illustrating a configuration of a cluster control server according to an exemplary embodiment.

A cluster control server 100 according to an exemplary embodiment includes an ESS management device 110, a load management device 130, and an energy supply management device 150.

The ESS management device 110 computes current stored energy amounts with respect to the respective ESSs in the cluster and controls charging and discharging of the ESSs based on the computed current stored energy amounts i.e., estimated amounts of energy currently stored in each respective ESS. The ESS management device 110 may directly manage and control respective ESSs in the cluster. However, according to an exemplary embodiment, as shown in FIG. 4, the ESS management device 110 may communicates with each BMS associated with each ESS in the cluster to collect information about an ESS from the BMS and to control charging and discharging of the ESS using the BMS.

Figure 5A:
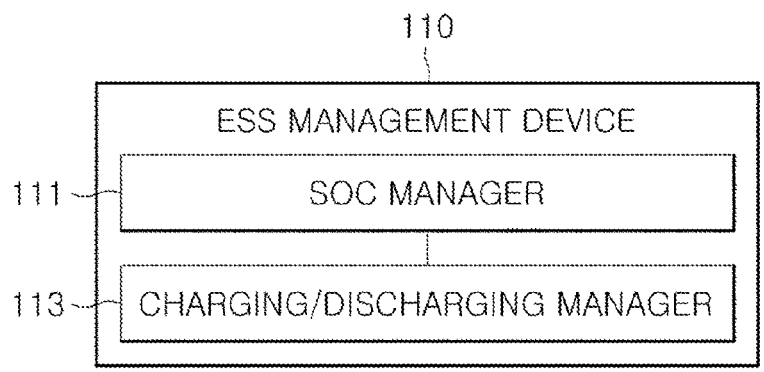
FIGS. 5A and 5B are block diagrams illustrating configurations of an ESS management device and a load management device, respectively, according to an exemplary embodiment.

An exemplary overview of the ESS management device 110 will be provided with reference to FIG. 5A according to an exemplary embodiment. FIG. 5A shows an example of a configuration of an ESS management device according to an exemplary embodiment.

The ESS management device 110 may include a State of Charge (SOC) manager 111 which acquires State of Charge (SOC) information with respect to respective ESSs in the cluster in real time or periodically, and integrate the information to compute a current stored energy amount of each ESS. For example, the ESS management device 110 may acquire SOC information using a BMS associated with the ESS and integrate capacity and a temperature of the ESS, and weather and a temperature of a corresponding zone to compute a current stored energy amount of the ESS.

A charging/discharging manager 113 controls charging and discharging with respect to each ESS based on the current stored energy amount information. The charging/discharging manager 113 may directly control each ESS. However, preferably, the charging/discharging manager 113 may transmit control information to a BMS associated with each ESS to control the ESS through the BMS.

Referring back to FIG. 4, a configuration of a cluster control server 100 will further be described. The load management device 130 acquires and analyzes consumed energy amount information with respect to loads of a consumption facility or a building in which respective ESSs are arranged to manage energy consumption with respect to the respective loads. The load management device 130 may directly recognize consumed energy amount with respect to loads associated with respective ESSs in the cluster, and control respective loads based on the consumed energy amount. However, according to an exemplary embodiment, as shown in FIG. 4, the load management device 130 may acquire and analyze energy consumption information with respect to respective loads and accordingly cooperate with HEMS, BEMS or FEMS controlling the loads to acquire and control energy consumption information with respect to the respective loads.

Figure 5B:
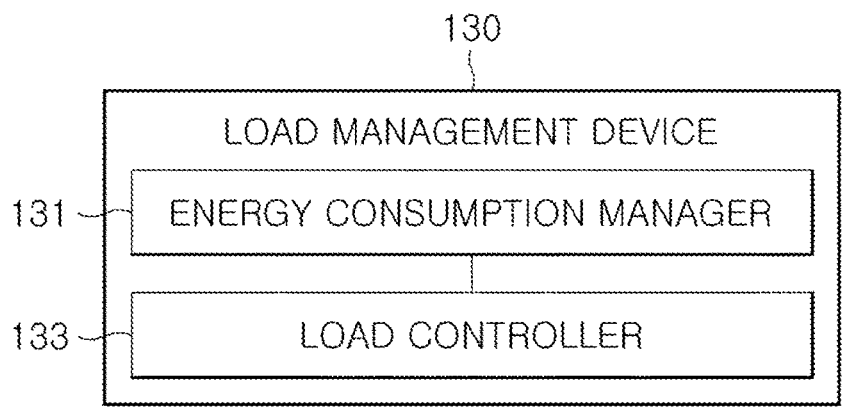

To do this, an exemplary embodiment of a configuration of the load management device 130 will be described with reference to FIG. 5B. An energy consumption manager 131 acquires energy consumption information of loads associated with respective ESSs and analyzes an energy consumption pattern using the energy consumption information to compute real time energy consumption amount information and expected energy consumption amount information with respect to the respective loads, and a load controller 133 may control energy consumption of each load based on the energy consumption amount information analyzed by the energy consumption manager 131.

As described above, the energy consumption manager 131 and the load controller 133 operatively communicates with HEMS, BEMS, or FEMS managing and controlling each load to acquire energy consumption amount information of each load and control each load accordingly.

Referring back to FIG. 4, a configuration of the cluster control server 100 will further be described. The energy supply management device 150 acquires energy consumption amount information associated with loads of each ESS using the load management device 130, determines an energy level with respect to each ESS based on the energy storing amount information acquired by the ESS management device 110, determines a redundant stored energy amount and insufficient amount of each ESS to distribute redundant energy between the ESSs.

Figure 6:
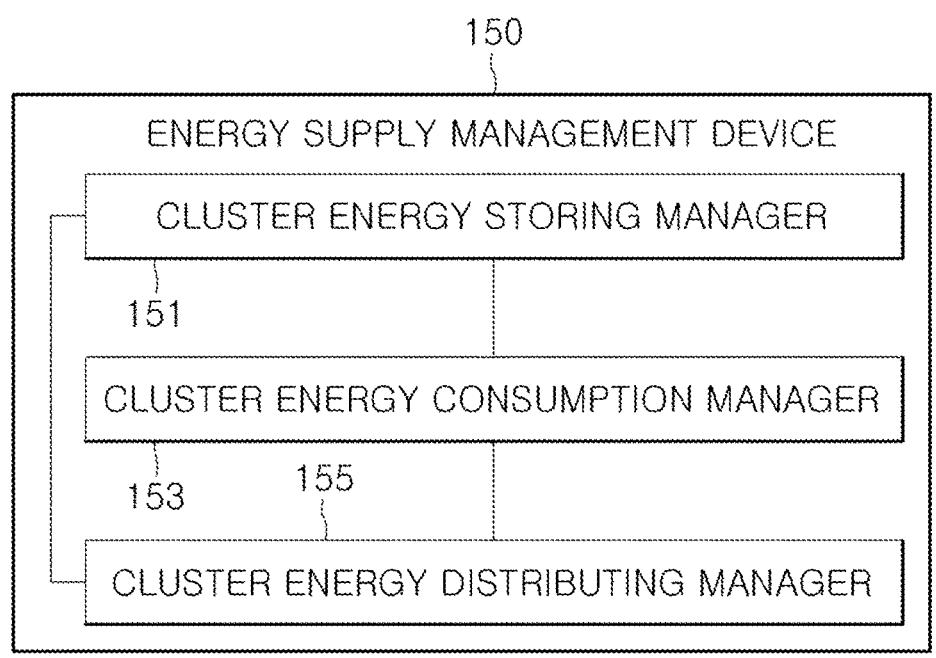
FIG. 6 is a block diagram illustrating a configuration of an energy supply management device according to an exemplary embodiment.

An exemplary configuration of the energy supply management device 150 will be described in detail according to an exemplary embodiment. FIG. 6 illustrates a configuration of an energy supply management device according to an exemplary embodiment.

The energy supply management device 150 may include a cluster energy storing manager 151, a cluster energy consumption manager 153, and a cluster energy distributing manager 155.

The cluster energy storing manager 151 determines an energy level based on stored energy amount information of each ESS in the cluster operatively associated with the ESS management device 110. Here, the stored energy amount information include expected stored energy amount information according to a charging plan of an ESS by the ESS management device 110 as well as a currently stored energy amount of the ESS.

The cluster energy consumption manager 153 determines a redundant energy supply amount or an insufficient energy supply amount of each ESS based on consumption energy amount information of loads connected to an ESS arranged in the consumption facility or the building and the energy storing amount information determined by the energy storing manager 151 by operatively communicating with the load management device 130 (shown in FIG. 4).

Further, the cluster energy distributing manager 155 determines an energy supply difference of ESSs in the cluster based on information of the cluster energy storing manager 151 and the cluster energy consumption manager 153, and manages distribution of energy stored in each ESS based on the determined energy supply difference of ESSs.

As illustrated above, the control system of the energy storage cluster according to exemplary embodiment may distribute energy between ESSs according to an energy supply difference between ESSs in the cluster based on the cluster control server such that the cluster may manage the energy independently of the energy supplied from the external power system with respect to a predetermined zone divided by the cluster.

In an exemplary embodiment, the server includes devices, which include one or more managers and/or a controller. Each device, manager, and a controller may be software per se, a combination of software and hardware, or hardware. For example, a server may include a memory which store the devices and a processor which executes these devices. By way of another example, each device may include a processor, a microprocessor, a field programmable gate array (FPGA), and/or an application specific integrated circuit (ASIC).

Although described as a server 100, one of ordinary skill in the art would readily appreciate that the server 100 may be implemented as a number of servers remotely connected via a network and may include one or more databases. A server 100 is an illustrative, non-limiting example of a cluster controller which controls the distribution of energy among ESSs in a cluster according to an exemplary embodiment. One of ordinary skill in the art would readily appreciate that a description of a server 100 is provided by way of an example only and not by way of a limitation.

The following is a description of an exemplary method for distributing energy in a cluster using a control system of an energy storage cluster according to an exemplary embodiment. The cluster control server 100 classifies an energy level according to stored energy amount information of each ESS in the cluster, determines an ESS supplying the energy and an ESS receiving the energy to determine energy distribution, and distributes the energy between ESSs according to the determined energy distribution.

Figure 7:
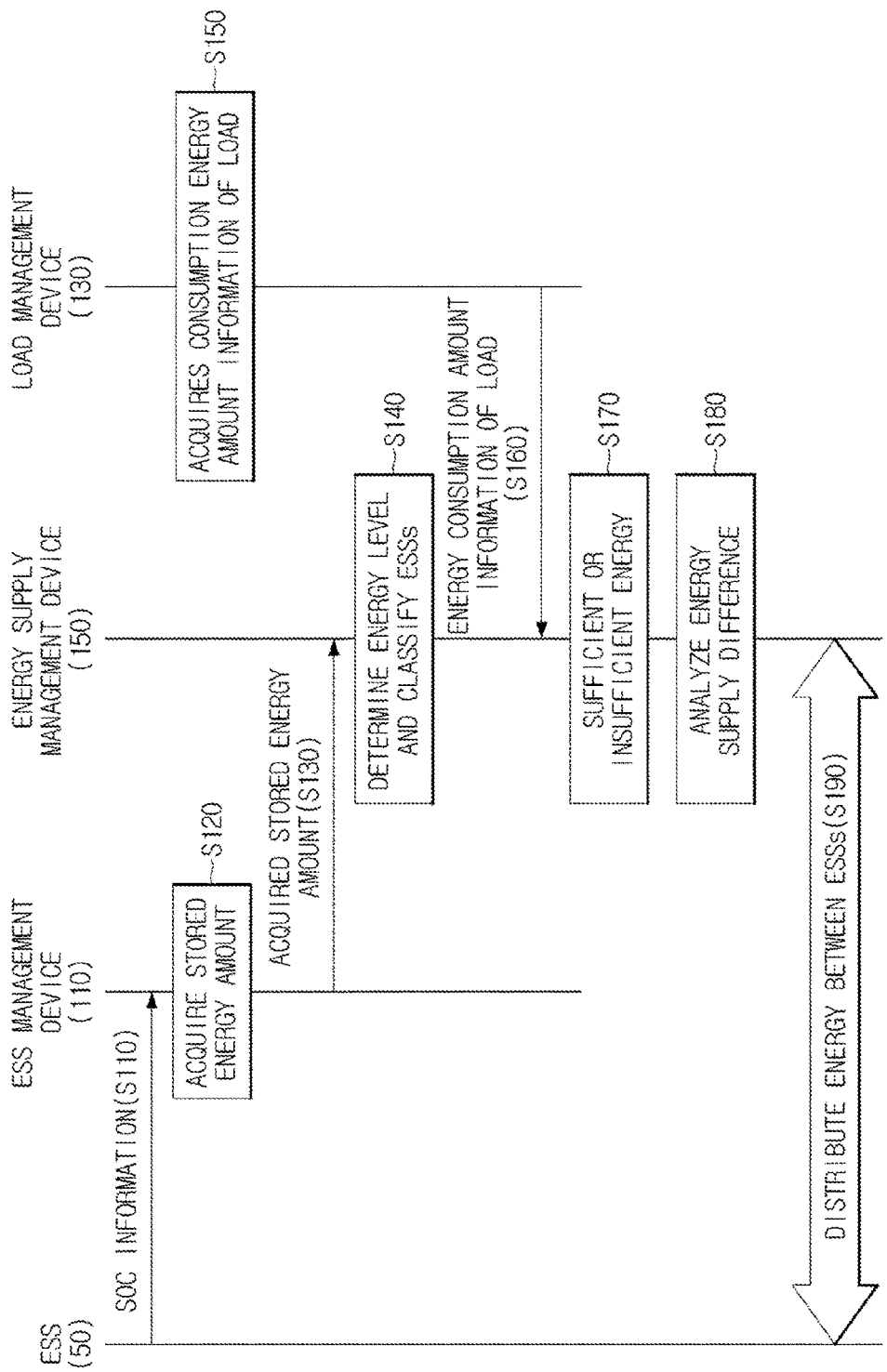
FIG. 7 is a scheme diagram illustrating a method for distributing energy using a control system of an energy storage cluster according to an exemplary embodiment.

The following is a detailed description of a method for distributing energy in a cluster according to an exemplary embodiment. FIG. 7 is a scheme diagram illustrating a method for distributing energy using a control system of an energy storage cluster.

An energy distribution between ESSs 50 in the cluster is achieved by a cluster server 100 in an exemplary embodiment. The method for distributing energy is firstly described in an aspect that a cluster server 100 considers one ESS and a load associated with the ESS. An ESS management device 110 acquires SOC information of an ESS 50 (in operation S110), and acquires stored energy amount information of the ESS 50 based on the acquired SOC information (in operation S120).

According to an exemplary embodiment, the stored energy amount information with respect to the ESS 50 was described in an exemplary description of a configuration of the ESS management device 110 described with reference to FIGS. 4 and 5. Exemplary methods will be described in detail according to an exemplary embodiment. FIG. 8 is a flowchart illustrating a method of acquiring stored energy amount information with respect to an ESS according to an exemplary embodiment.

The ESS management device 110 acquires SOC information of the ESS 50 (in operation S121), computes a current stored energy amount with respect to the ESS 50 based thereon (in operation S123), and establishes a charging plan of the ESS based on the current stored energy amount of the ESS 50 (in operation S125). Since the current stored energy amount of the ESS 50 to a certain time is computed according to the charging plan, the ESS management device 110 may acquire stored energy amount information of the ESS 50 in consideration of both of a currently stored energy amount and an expected stored energy amount (in operation S127).

Referring back to FIG. 7, when the ESS management device 110 acquires the stored energy amount with respect to the ESS 50 (in operation S120), and transmits it to the energy supply management device 150 (in operation S130), an energy supply management device 150 determines an energy level with respect to the ESS based on the stored energy amount information of the ESS to classify ESSs according to a corresponding energy level (in operation S140).

Further, the load management device 130 acquires energy consumption amount information of a load associated with the ESS 50 (in operation S150), and transmits it to the energy supply management device 150 (in operation S160). A schematic exemplary flow with respect to the energy consumption amount information of a load associated with the ESS 50 is described in a description of a configuration of the load management device 130 with reference to FIGS. 4 and 5. A method of acquiring load energy consumption amount information will be described in detail with reference to FIG. 9 according to an exemplary embodiment. FIG. 9 is a flowchart illustrating a method of acquiring load energy consumption amount information in an exemplary embodiment.

The load management device 130 may acquires energy consumption amount information of a load associated with the ESS 50 (in operation S151), analyze an energy consumption pattern of the load based on the acquired energy consumption information (in operation S153), and compute an expected next energy consumption amount of the load using the analyzed result (in operation S155). As described above, the load management device 130 acquires energy consumption amount information with respect to the load based on both of an expected energy consumption amount to a predetermined time point and a current energy consumption amount with respect to the load (in operation S157).

Referring to FIG. 7, the load management device 130 may determine whether there is sufficient or insufficient energy to be supplied to the load with respect to the ESS 50 based on an energy level using stored energy amount information with respect to the ESS 50 from the ESS management device 110 (in operation S170), and numerically recognize exact redundant or insufficient energy supply amount.

The foregoing method may be repeatedly performed with respect to all ESSs or partially selected ESSs in the cluster to recognize a redundant or insufficient energy supply amount with respect to each ESS.

Figure 10:
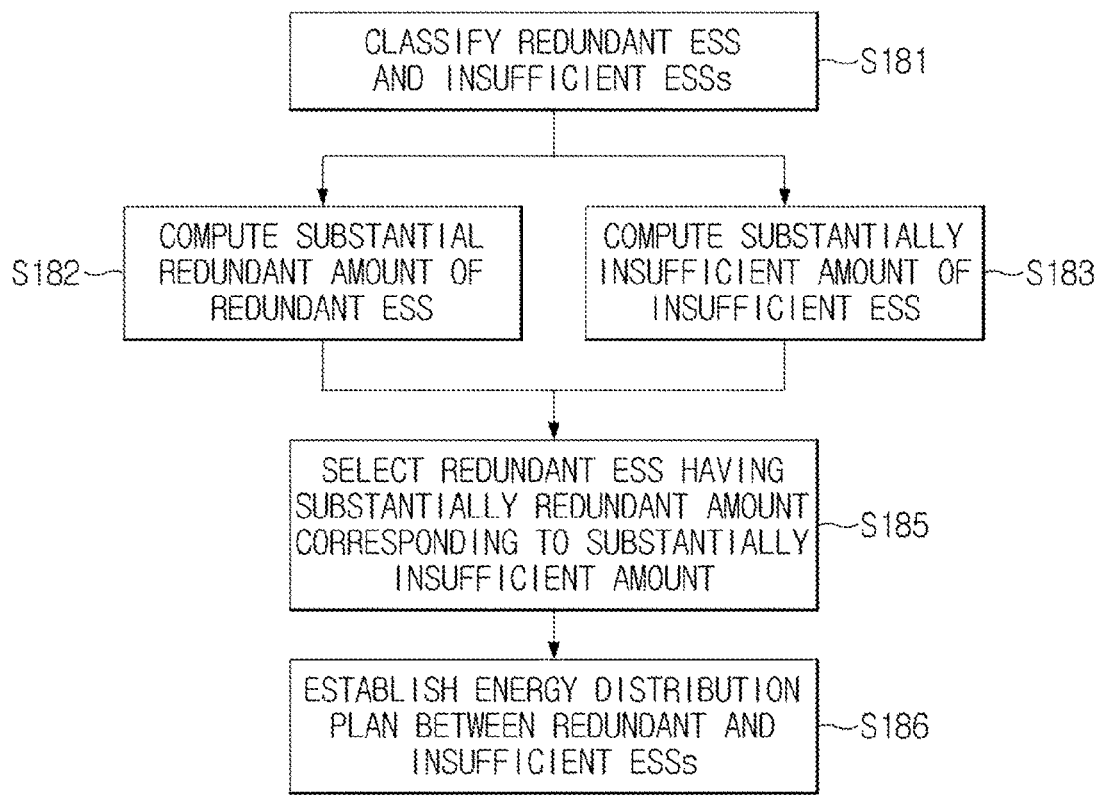
FIG. 10 is a flowchart illustrating a method of analyzing an energy supply difference between ESSs in an exemplary embodiment.

If the redundant or insufficient energy supply amount with respect to all ESSs or partially selected ESSs in the cluster is recognized, an energy supply difference with respect to the ESS is analyzed in comparison with the redundant or insufficient energy supply amount with respect to the ESS (in operation S180). FIG. 10 is a flowchart illustrating a method of analyzing an energy supply difference between ESSs according to an exemplary embodiment.

First, an ESS storing a redundant energy supply amount is classified as the ESS storing a redundant energy supply amount (in operation S181), a substantial redundant amount with respect to a stored energy amount is computed based on energy consumption amount information of a load associated with the redundant ESS (in operation S182), and a substantially insufficient amount with an insufficient ESS is computed based on expected stored energy amount information considering a power generation amount using an associated renewable energy (in operation S183).

Here, since exemplary energy consumption amount information and exemplary stored energy amount information were previously described in detail, a detailed description will be omitted in order to avoid the repetition. A substantial redundant amount with respect to a redundant ESS may be computed based on expected stored energy amount information. A substantially insufficient amount with respect to an insufficient ESS may be computed based on an energy consumption amount.

As described above, if a substantially redundant amount with respect to a redundant ESS and a substantially insufficient amount with respect to an insufficient ESS are computed, a redundant ESS having a substantially redundant amount is selected corresponding to the substantially insufficient amount of the insufficient ESS (in operation S185). For example, a substantially insufficient amount of the redundant ESS does not exceed a substantially redundant amount of any redundant ESS, then only one redundant ESS may be selected. If the substantially insufficient amount of the insufficient ESS corresponds to substantially redundant amounts of a plurality of redundant ESSs, then the redundant ESSs need to be associated and selected to match with each other.

If a redundant ESS with respect to a substantially insufficient amount is selected, an energy distribution plan for transmitting energy from a redundant ESS to an insufficient ESS is established (in operation S186). If a redundant ESS supplying energy is located adjacent to an insufficient ESS, transmission of the energy is possible. If the redundant ESS supplying energy to the insufficient ESS is located far away from the insufficient ESS, energy loss is great and transmission efficiency of the energy is deteriorated during the supply of the energy. Accordingly, energy transmission between a redundant ESS and an insufficient ESS located far away from each other may be achieved through a third ESS located between the redundant ESS and the insufficient ESS. That is, the third ESS may transmit an energy amount to be transmitted from the redundant ESS to the insufficient ESS, and receive a corresponding energy amount from the redundant ESS.

Referring back to FIG. 7, the method for distributing energy according to an exemplary embodiment of the present invention will further be described.

If the energy distribution plan between the redundant ESS and the insufficient ESS is established (in operation S186 shown in FIG. 10), the energy supply management device 150 distributes energy from the redundant ESS to the insufficient ESS according to the established plan (in operation S190).

In an exemplary embodiment described above, a cluster control server efficiently control charging and discharging of distributed ESSs, energy in a full charging state or of an ESS storing a redundant supply amount may be used, and efficiency of an operation of the ESS may be increased according to energy exchange between ESSs.

Further, a charging and discharging plan with respect to respective ESSs is established based on chargeable amounts of a plurality of grouped ESSs without limiting a single ESS and expected power use of a consumption facility with loads associated therewith. The energy may be distributed according to the established plan to minimize a difference between a redundant energy amount and an insufficient energy amount, thereby increasing efficiency of energy consumption.

In addition, an exemplary embodiment presents a system and a method for distributing energy between clusters. Fundamental configuration and flow in an exemplary embodiment are similar to energy distribution between ESSs in a cluster according to an exemplary embodiment, accordingly, the repeated description is omitted and an overview will simply be given.

Figure 11:
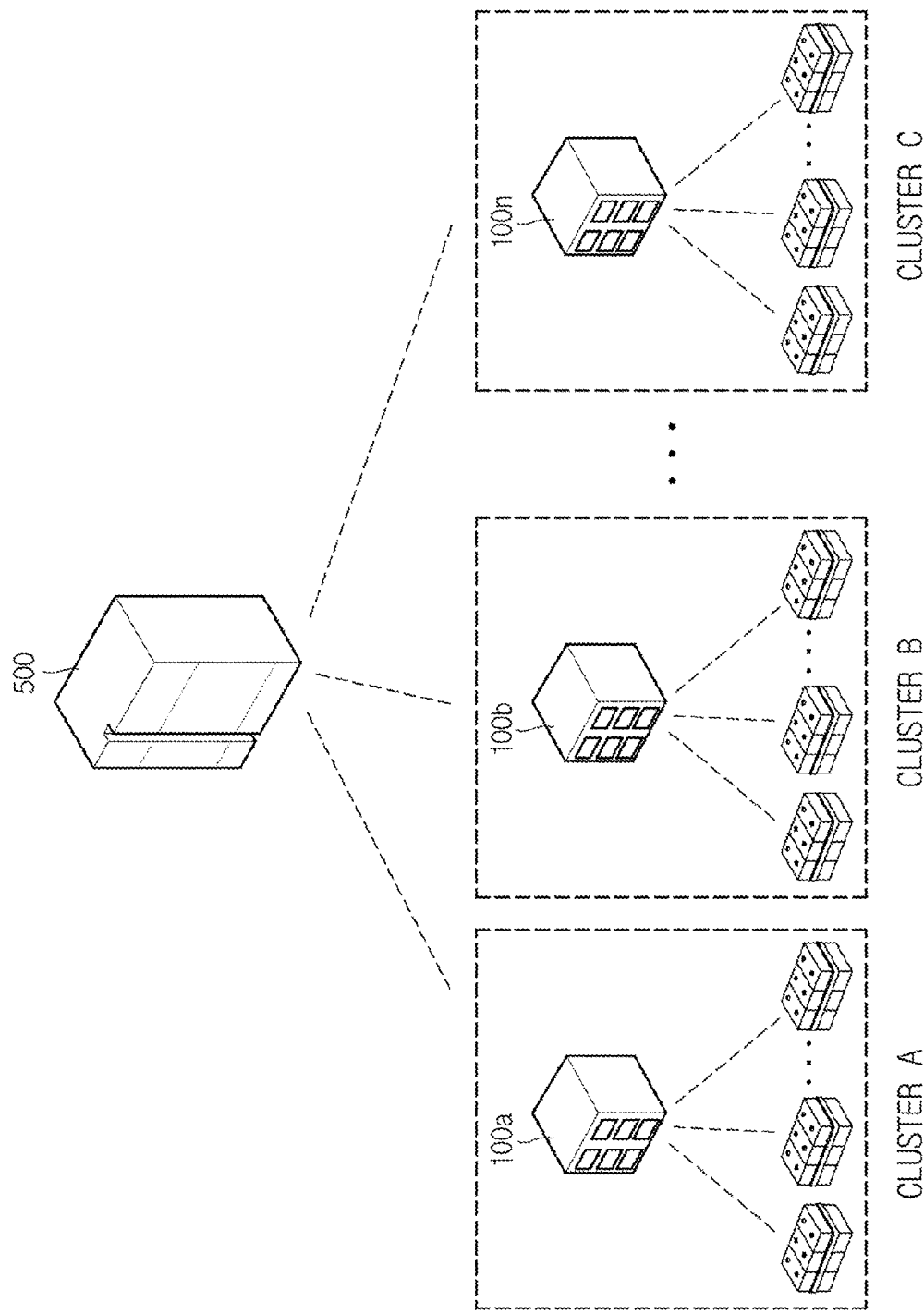
FIG. 11 is a schematic diagram illustrating a system for distributing energy among clusters according to an exemplary embodiment of the present invention.

FIG. 11 is a schematic diagram illustrating a system for distributing energy between clusters according to an exemplary embodiment.

As illustrated in an embodiment of FIG. 11, respective cluster control servers 100a, 100b, . . . 100n in a plurality of clusters partitioned by predetermined zones manage ESSs in a corresponding cluster, and an exemplary embodiment regards one cluster as one large ESS through the foregoing configuration.

That is, a cluster A, a cluster B, and a cluster N become a large energy storage cluster by integrating ESSs arranged in the zone. The central control server 500 acquires respective cluster information through respective cluster control servers 100a, 100b, . . . 100n and controls the cluster control servers 100a, 100b, . . . 100n to achieve energy distribution between clusters.

Figure 12:
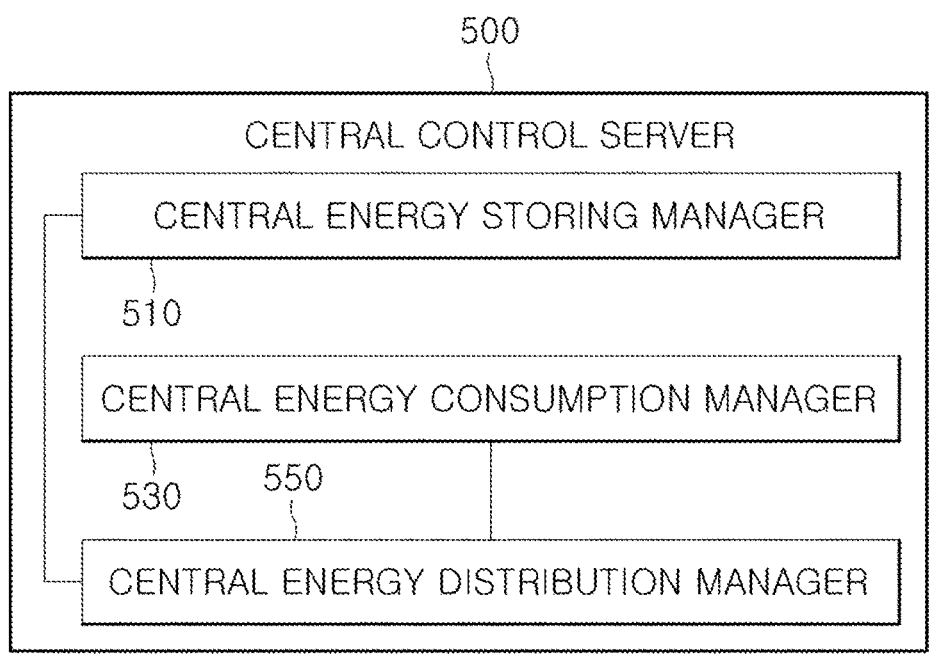
FIG. 12 is a block diagram illustrating a central control server according to an exemplary embodiment.

FIG. 12 is a block diagram illustrating a central control server according to an exemplary embodiment.

The central control server 500 includes a central energy storing manager 510, a central energy consumption manager 530, and a central energy distribution manager 550. The central energy storing manager 510 manages stored energy amount information of each cluster. Here, as illustrated above, the cluster may include a current stored energy amount and an expected energy amount capable of charging and storing to a next time point.

The central energy consumption manager 530 manages energy consumption amount of each cluster. As described above, the energy consumption amount information may include current energy consumption amounts of all loads in a cluster and an expected energy consumption amount according to an energy consumption pattern analysis of respective loads.

The central energy distribution manager 550 manages energy distribution between clusters based on information of the central energy storing manager 510 and the central energy consumption manager 530, and may apply the foregoing energy supply difference to distribute the energy.

In an exemplary embodiment, the server 500 includes managers. Each manager may be software per se, a combination of software and hardware, or hardware. For example, a server may include a memory which store the managers and a processor which executes these managers. By way of another example, each manager may include a processor, a microprocessor, a field programmable gate array (FPGA), and/or an application specific integrated circuit (ASIC).

Although described as a server 500, one of ordinary skill in the art would readily appreciate that the server 500 may be implemented as a number of servers remotely connected via a network and may include one or more databases. A server 500 is an illustrative, non-limiting example of a multi-cluster controller which controls the distribution of energy among clusters according to an exemplary embodiment. One of ordinary skill in the art would readily appreciate that a description of a server 500 is provided by way of an example only and not by way of a limitation.

The following is a method for distributing energy between clusters using a system for distributing energy between clusters according to an exemplary embodiment.

Figure 13:
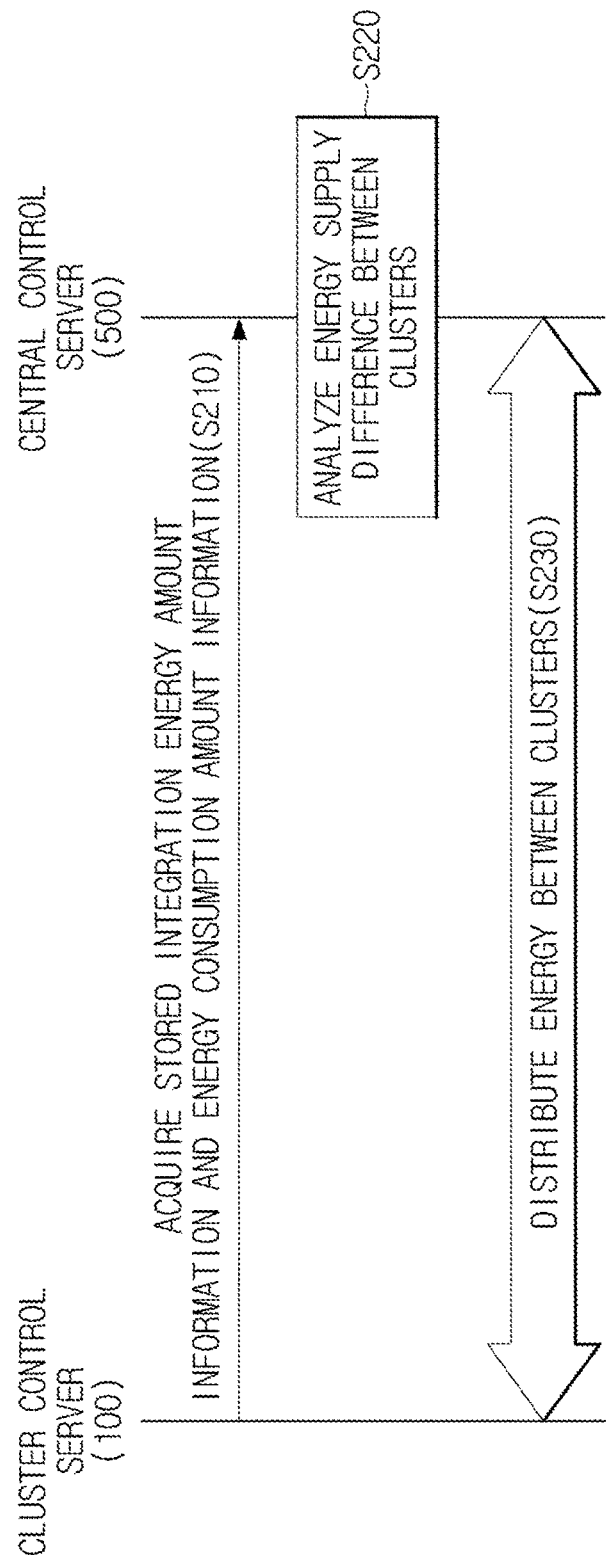
FIG. 13 is a scheme diagram schematically illustrating a method for distributing energy between clusters using a system for distributing energy between clusters according to an exemplary embodiment.

FIG. 13 is a scheme diagram schematically illustrating a method for distributing energy between clusters using a system for distributing energy between clusters according to an exemplary embodiment.

A central control server 500 acquires stored integration energy amount information of grouped ESSs in a cluster and integration energy consumption amount information of loads using each cluster control server 100 (in operation S210), and determines a redundant energy supply amount and an insufficient energy supply amount with respect to respective clusters.

Further, the central control server 500 may analyze an energy supply difference between clusters based on a redundant energy supply amount and an insufficient energy supply amount with respect to each cluster to select clusters storing the redundant energy supply amount for distributing the energy to a cluster in which supplied energy is insufficient (in operation S220), and distribute energy between the selected clusters (in operation 5230) to achieve energy distribution of a wide unit.

In a system for distributing energy between energy storage clusters according to an exemplary embodiment and a method for distributing energy between energy storage clusters according to an exemplary embodiment, clusters in which distributed ESSs are grouped by zones for each zone functions as one very large ESS, energy distribution is provided between a plurality of clusters, the self-energy management is possible in a small region as well as a wide area independent of an external power system.

In an exemplary embodiment, energy in a cluster in which a plurality of distributed ESSs are grouped is efficiently distributed to a predetermined zone partitioned by the cluster such that the cluster may mange the energy independently of supply of the energy from an external power system.

In particular, a central office efficiently controls charging and discharging of distributed ESSs such that a user may efficiently use energy of an ESS with redundant supply amount in fully charged state. Further, according to energy exchange between ESSs, efficiency with respect to an operation of the ESSs may further be improved in an exemplary embodiment.

Furthermore, a charging and discharging plan with respect to respective ESSs is established based on chargeable amounts of a plurality of grouped ESSs without limiting a single ESS and expected power use in a consumption facility of loads associated therewith. The energy may be distributed according to the established plan to minimize a difference between a redundant energy amount and an insufficient energy amount, thereby increasing efficiency of energy consumption according to an exemplary embodiment.

In addition, since a cluster in which distributed ESSs are grouped by zones functions as one very large ESS and energy between a plurality of clusters is distributed, the self-energy management is possible in a small region as well as in a wide area independent of an external power system according to an exemplary embodiment.

Although exemplary embodiments have been described above in detail for illustrative purposes, it should be clearly understood that many variations, additions, substitutions, and modifications of exemplary embodiments herein described which are readily apparent to those skilled in the art still fall within the spirit and scope of the present disclosure, which is defined in the appended claims and their equivalents. As described above, exemplary embodiments are merely exemplary and are not to be construed as limiting. Those skilled in the art can implement various changes and modifications from the above description of exemplary embodiments. Moreover, various modifications to these exemplary embodiments will be readily apparent to those skilled in the art, and the generic principles and specific examples defined herein may be applied to other exemplary embodiments.

What is claimed is:

1. A control system of an energy storage cluster, the system comprising:
   a plurality of energy storage systems (ESSs) which supply power to a plurality of respective loads;
   a cluster control server which distributes energy between the ESSs based on individual energy levels stored in the ESSs with respect to energy required by the plurality of respective loads,
   wherein the cluster control server comprises a load management device which acquires energy consumption amount information with respect to the plurality of respective loads and analyzes an energy consumption pattern using the acquired energy consumption amount information in order to compute real time energy consumption amount information and expected energy consumption amount information with respect to the plurality of loads, and
   wherein the cluster control server further comprises:
   an ESS management device which computes current stored energy amount in each of the ESSs and which controls charging and discharging based on the computed current stored energy amounts; and
   an energy supply management device which determines redundant stored energy and insufficient amounts of energy for each of the ESSs based on the acquired energy consumption amount of a respective load associated with each respective ESS and an energy level of said each respective ESS obtained based on the computed current stored energy amount for said each respective ESS to distribute energy between the ESSs,
   wherein the ESS management device is configured to compute the current stored energy amount in each respective ESS based on weather and temperature information that corresponds to a zone in which the respective ESS is located.

2. The control system of claim 1, wherein the energy supply management device comprises:
   a cluster energy storing manager which determines an energy level based on the computed stored energy amount information of said each respective ESS obtained by communicating with the ESS management device;
   a cluster energy consumption manager which determines a redundant energy supply amount or an insufficient energy supply amount of said each respective ESS based on energy consumption amount information obtained by communicating with the load management device; and
   a cluster energy distributing manager which determines an energy supply difference of the ESSs based on information provided by the cluster energy storing manager and by the cluster energy consumption manager, and which manages a distribution of energy stored in said each respective ESS based on the determined energy supply difference of ESSs.

3. The control system of claim 1, wherein the ESS management device comprises:
   a State of Charge (SOC) manager which acquires SOC information of said each respective ESS in real time or periodically, and which integrates the acquired SOC information to compute a current stored energy amount of said each respective ESS; and
   a charging/discharging manager which controls charging and discharging with respect to said each respective ESS based on the current stored energy amount information obtained from the SOC manager.

4. The control system of claim 1, further comprising:
   a plurality of clusters divided by zones and each having a corresponding set of loads and a corresponding set of ESSs; and
   a central control server which acquires energy supply information of the plurality of clusters and which distributes energy of a cluster storing a redundant energy supply amount with respect to a first respective load to a cluster in which energy supplied to a second respective load is insufficient by communicating with respective cluster servers.

5. The control system of claim 4, wherein the central control server comprises:
   a central energy storing manager which manages stored energy amount information of each cluster;
   a central energy consumption manager which manages energy consumption amount of the cluster; and
   a central energy distribution manager which manages energy distribution between the clusters based on information from the central energy storing manager and the central energy consumption manager.

6. The control system of claim 4, wherein the central controller communicates with respective cluster controllers to distribute energy among respective clusters.

7. The control system of claim 1, wherein a respective load which consumes energy and a corresponding ESS which supplies power is associated with a respective facility or a building.

8. The control system of claim 7, wherein the facility or the building is associated with at least one additional load which consumes energy.

9. The control system of claim 1, wherein the ESS stores power produced by a power generation equipment which generates power using a renewable power source comprising at least one of solar light, wind power, and tidal power.

10. The control system of claim 1, wherein the ESS stores power from an external power source during a time period when energy consumption is low or when costs of power are low.

11. The control system of claim 1, wherein the ESSs use an installed grid of an external power system or a grid separately formed to connect the ESSs with each other.

12. The control system of claim 1, wherein the cluster control server controls an ESS with a redundant energy amount to supply the redundant energy amount to one of adjacent ESSs and if the one adjacent ESS has a sufficient energy amount, the one adjacent ESS supplies a portion of the sufficient energy amount to one of adjacent ESS until an ESS with insufficient energy amount receives the portion of the sufficient energy amount.

* * * * *